No. 870,708.  
PATENTED NOV. 12, 1907.

C. ADAMS-RANDALL.  
WHEEL.  
APPLICATION FILED FEB. 21, 1906.

2 SHEETS—SHEET 1.

Witnesses:  
O. D. Kesler  
W. B. Keefer

Inventor  
Charles Adams Randall  
By James L. Norris  
Atty.

No. 870,708. PATENTED NOV. 12, 1907.
C. ADAMS-RANDALL.
WHEEL.
APPLICATION FILED FEB. 21, 1906.

2 SHEETS—SHEET 2.

Witnesses:

Inventor
Charles Adams-Randall
By
James L. Norris
Atty.

UNITED STATES PATENT OFFICE.

CHARLES ADAMS-RANDALL, OF NEW YORK, N. Y.

WHEEL.

No. 870,708.

Specification of Letters Patent.

Patented Nov. 12, 1907.

Application filed February 21, 1906. Serial No. 302,311.

*To all whom it may concern:*

Be it known that I, CHARLES ADAMS-RANDALL, a citizen of the United States, residing at New York, in the county of New York and State of New York, have invented new and useful Improvements in Wheels, of which the following is a specification.

This invention relates to wheels for automobiles and the like, self-propelled cars, and vehicles generally.

In the construction of self-propelled and other vehicles, it has been found necessary and convenient to have resilient or elastically cushioned wheels to prevent excessive jolting to the occupants of the vehicle, and injury to, and derangement of the working parts, and undue wear and tear of such parts. Heretofore, for this purpose it has been customary to use pneumatic tires secured upon the rims of the wheels of the vehicle. These pneumatic tires have been found exceedingly costly, cumbersome, unsightly, unsatisfactory, and require continuous repair to maintain the same in practical condition, and aside from their structural deficiencies such form of tire has been found dangerous in view of puncturing, bursting, and disengagement thereof from the wheel when moving at a high rate of speed, and many accidents, frequently fatal, have occurred by the use of such form of tire.

The object of the present invention is to overcome the several objections noted with respect to cushion tires as now commonly used, and to produce a novel, cheap, reliable and safe resilient wheel to be used in lieu of the exposed pneumatic tire structures.

To this end, the invention consists generally of a wheel constructed in two main parts or portions, such as a central part or hub and spoke portion, and an exterior portion or rim, with intermediary means for joining the two parts so that they will revolve together practically as one solid wheel.

Figure 1:
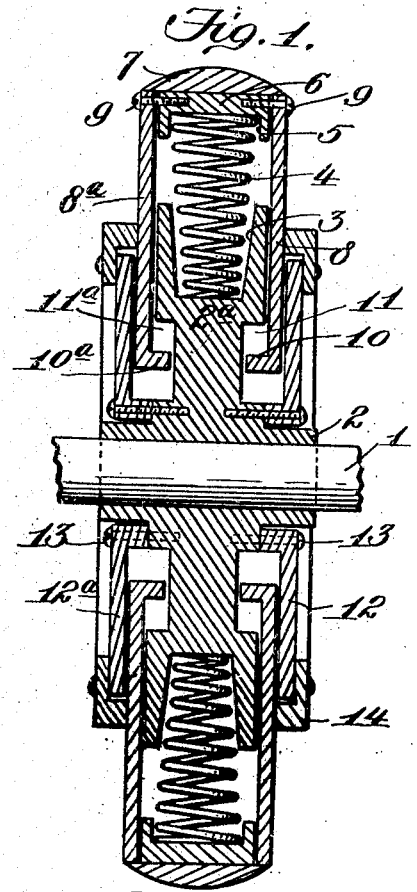
Figure 2:
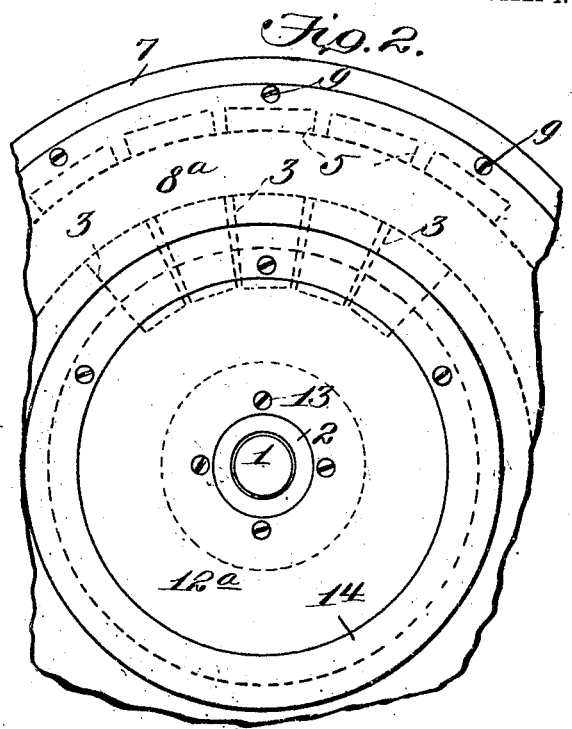
Figure 3:
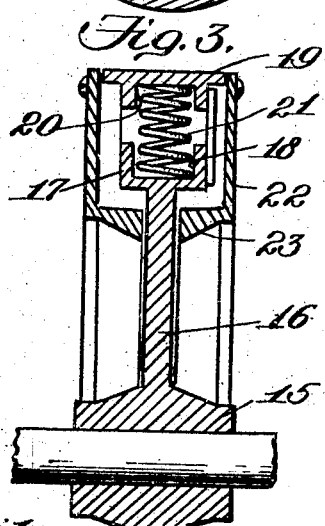
Figure 4:
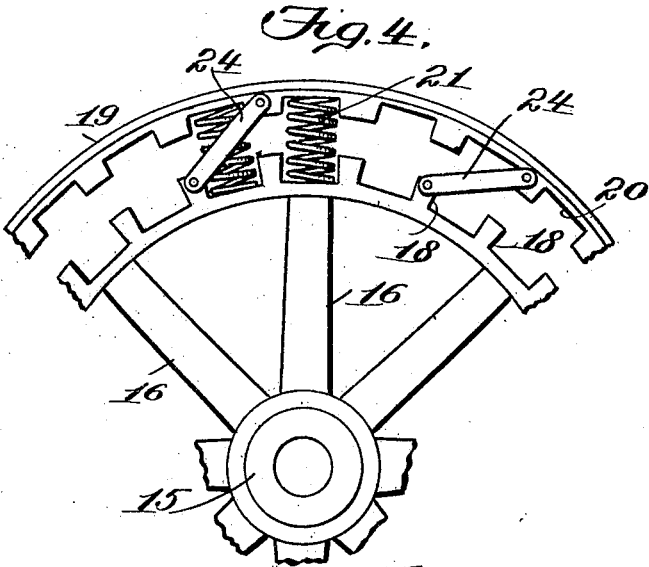
Figure 5:
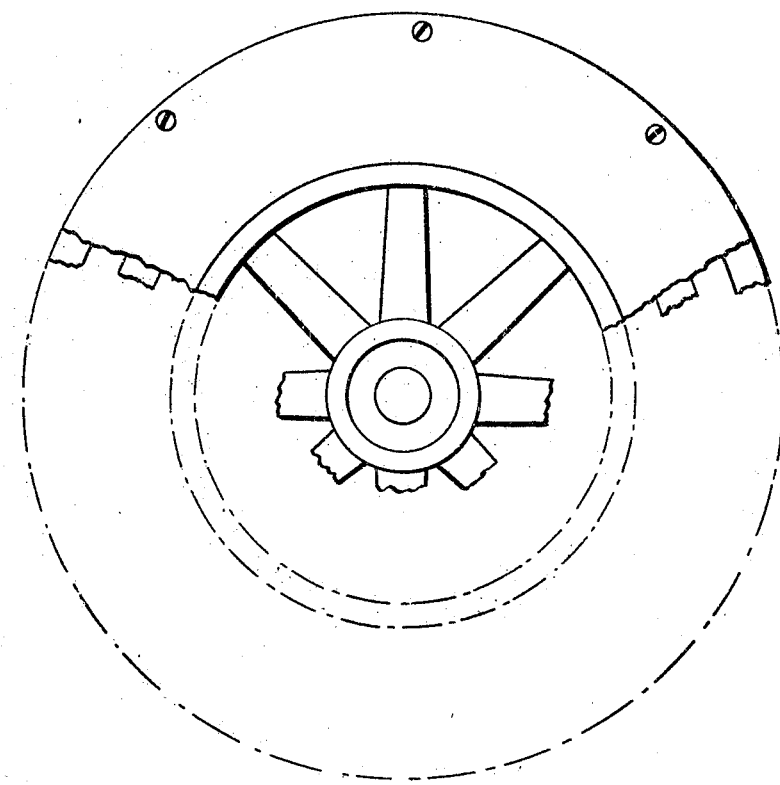
Figure 6:
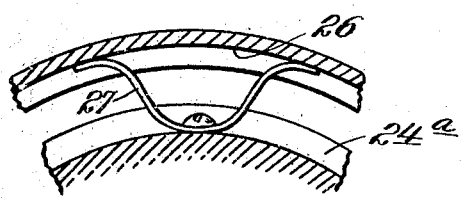
Figure 7:
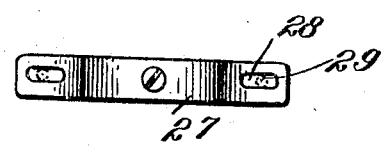

In the drawings, Figure 1 illustrates a transverse vertical section of a wheel embodying the features of the invention. Fig. 2 is a side elevation of a portion of the wheel. Fig. 3 is a transverse vertical section through a portion of a modified form of the wheel. Fig. 4 is a side elevation of a portion of the wheel shown by Fig. 3 and having a part thereof removed. Fig. 5 is a view similar to Fig. 4, showing a portion of the wheel applied, Fig. 6 is a longitudinal vertical section of a portion of the wheel showing a further modification. Fig. 7 is a detail plan view of a spring adapted to be used in the form of the wheel shown by Fig. 6, illustrating a still further modification.
Similar numerals of reference are employed to indicate corresponding parts in the several views.

Referring to Figs. 1 and 2, the numeral 1 represents an axle upon which is fitted, rigidly or loosely, the central portion, body or hub 2, having an outwardly projecting flange 2ª in which tapering seats 3 are formed and open out through the periphery of said flange. In the seats 3 the inner reduced extremities of suitable coil springs 4 are held, the outer ends or extremities of said springs being fitted in seats 5 formed in the inner surface of the outer portion or rim 6 of the wheel. As many of these springs are axially arranged around the wheel as may be required, and according to the resilient force that may be necessary to sustain the rim and the wheel as an entirety in normal position and support the entire weight of a vehicle and its load without any material compression of the springs. It is preferred that as many of these springs as may be arranged around the circumference of the wheel be used to arrive at the result sought, or to obtain greater resiliency and without imposing the least undue strain on any single spring. These springs yield to any increased external pressure because of the wheel coming in contact with or passing over obstacles or irregularities of a rough roadway, thus preventing excessive jolting to the occupants of the vehicle and injury by vibration of the working parts of a motor or other portions of the vehicle.

The improved wheel may be made of any suitable material having sufficient strength. The outer portion of the rim may have a suitable metal or rubber tire 7 secured thereon.

The normal relative position of the hub 2 and the rim 6, as before indicated, is maintained by the normal tension upon the springs, and the side contacts of the springs in the outer and inner seats in which they are held serve to cause the hub and rim of the wheel to revolve together, or, in other words, the wheel is practically a solid structure.

The two main parts of the wheel are also loosely joined together by means of annular side plates 8—8ª secured to the rim 6 by means of suitable bolts, screws, or otherwise, as at 9. These plates bear with more or less friction upon the side surface of the flange or spokes of the hub, and are provided at their inner ends with inwardly projecting right angled annular flanges 10—10ª which movably fit in annular recesses 11—11ª provided in the opposite sides of the flange 2ª adjacent to the hub. When the springs are compressed, the side plates 8—8ª move to and from the axle in proportion to the compression of the springs, but under all conditions the said movement is limited to the length of the recesses 11—11ª, thus preventing undue tension upon the springs, and avoid breaking the latter. Retaining plates 12—12ª surround the end portions of the hubs and are secured thereto, as at 13, said plates serving to strengthen and hold the lower portions of the side plates 8—8ª in normal movable position and to take up any undue side strain thereon. These retaining plates also serve to protect the main parts of the wheel from dust and dirt and by the addition of a suitable cover of rubber or leather, as at 14, secured to the outer edge of the plates 12—12ª, the wheel is made both dust and waterproof.

The side plates may be of cast or pressed steel, or other metal, and in some instances may have corrugated surfaces to resemble the spokes of an ordinary wheel, or be flat on the side and embellished by paint to represent a wheel having spokes. This is a mere matter of design in detail structure, and it is obvious that it may be modified.

In the form of the wheel shown by Figs. 3, 4, and 5, the main members are essentially the same, and comprise a hub 15 having an outwardly projecting flange 16, which may be cut or cast to form spokes 16, as clearly shown by Figs. 4 and 5, and secured to or forming a part of the outer terminals of the spokes is an annular member or rim 17 in which a plurality of seats 18 are provided. If preferred, the hub 15 and spokes 16 may be made in the usual way in wheel construction, or in the manner of the well known "artillery wheel" and provided with a suitable rim. The outer part of this modified form of the wheel consists of a rim 19 with a plurality of seats 20 on the inner surface thereof to aline with the seats 18, and terminally held in the said seats around the wheel are a series of springs 21. Secured to the opposite sides of the rim 19 and movable therewith are cover or shield plates 22, which have at their inner ends inwardly projecting annular flanges 23, which movably embrace the spokes 16.

In wheels of this class it is of greatest importance that the independent main portions of the wheel should move axially together without undue lost motion when traveling in a forward or backward direction. As shown herein, the helical springs resting at their terminals in suitable seats provided therefor, act by side contact or pressure, front and back, to carry the two parts of the wheel axially together. Other means, however, have been provided to accomplish this result, said means being used independently or as an auxiliary means coöperating with the springs. One means, as shown by Figs. 3 and 4, consists of a swiveled link 24 loosely secured to the outer and inner rims or portions of the wheel, at regular intervals apart, two or more of such links being preferably used, and inclosed within the cover or plate 22, as shown by Fig. 3.

As shown by Figs. 5 and 6, the seats formed in the rim and the member at the outer portion of the flange or rim 16 or the similar seat structures, as shown by Figs. 1 and 2, may be modified by providing the outer portion or edge of the hub flange or rim with a continuous or circumferential groove 24ª. and the inner portions of the rim 19 with a continuous groove or seat 26 and centrally securing flat springs 27 at regular intervals within the groove 24ª and projecting the ends of said springs into the groove 26.

As shown by Fig. 7, the flat springs 27 may be formed with end slots 28, through which pins 29 secured to or carried by the rim 19 project, thus permitting each of the springs to have free play without liability of disconnection or disarrangement with respect to the rim. The springs, as shown by Fig. 6, will have their ends secured in any suitable manner to the rim to cause the hub and its flange and rim to revolve, and in the construction shown by Fig. 7 the hub and its flange and the rim will also revolve together, but will have more liberty as to movement, in view of the provision of the slots 28.

In some structures it is also proposed to apply the links or connecting rods 24 on both sides of the wheel, which would be an obvious expedient, and said links may be composed of two parts, centrally connected or pivoted to permit greater freedom of action of the springs. The form of wheel shown by Figs. 3, 4, 5, and 6 may also be provided with a solid rubber or other tire for obtaining greater traction between the rim and the ground, and also for producing increased resiliency and to render the latter noiseless.

From the foregoing, it will be observed that the principle involved in the wheel as disclosed by the several forms is to have the rim movable with respect to the hub, or the latter shiftable in relation to the rim, and to interpose between the outer rim, and the rim of the hub and spoke portion of the wheel, resilient means to absorb jolts, jarring or excessive vibrations which otherwise would be transmitted to the body of the vehicle and the occupants of the same, and to prevent injury to the mechanism carried thereby and used therewith, combined with means for joining the independent outer and inner portions of the wheel by a loose mechanical connection, that causes the two parts to move axially together with a minimum degree of lost motion or backlash, with freedom of movement to and from each other.

Having thus described the invention, what is claimed, is:

1. In a wheel, the combination of a hub and spoke portion, the latter having a rim to which the outer ends of the spokes are secured and also provided with seats, an outer independent tire portion also provided with seats opposite those in the rim of the spoke portion, resilient means interposed between the rim and tire and terminally held in the seats, and devices secured to the tire portion and embracing and freely movable over the opposite sides of the spoke portion and inclosing the resilient means and the rim of the said spoke portion.

2. In a wheel, the combination of a hub and spoke portion having a rim to which the outer ends of the spokes are secured and provided with seats arranged closely together, an outer independent rim and tire portion also provided with corresponding seats and separated from the inner rim by an intervening space, resilient means interposed between the inner and outer rims and held terminally in the said seats, annular sides or covers secured to the outer rim and movable therewith and inclosing the resilient means, and loose mechanical connecting devices secured to the outer and inner rims and operative thereby.

3. In a wheel, the combination of a hub and spoke portion or section having a rim to which the outer ends of the spokes are secured, and provided with seats arranged closely together side by side, an outer independent rim and tire portion also provided with corresponding seats and separated from the inner rim by an intervening space, resilient means interposed between the inner and outer rim and held in the said seats, annular sides or covers secured to the outer rim and movable with the latter and inclosing the resilient means, and a swiveled connecting link loosely secured respectively at each end to the outer and inner rims.

4. In a wheel, the combination of a hub having a peripheral annular member provided with seats arranged closely together side by side, an independent outer rim surrounding the hub portion and also provided with seats in its inner circumferential surface opposite the seats formed in the hub portion, said rim being held in normal position by resilient devices interposed between the same and the hub portion and terminally held within the seats, cover devices or side plates secured to the outer rim and movable therewith and also movably embracing the opposite sides of the hub portion of the wheel, and a swiveled link device secured at its terminals to the outer rim and the hub portion respectively.

In testimony whereof I have hereunto set my hand in presence of two subscribing witnesses.

CHARLES ADAMS-RANDALL.

Witnesses:
 D. D. LOVELACE,
 C. S. RICHMAN.